July 12, 1949.  G. MARTIN  2,475,797
COLLAPSIBLE CART

Filed Nov. 1, 1947  4 Sheets-Sheet 1

INVENTOR.
GEORGE MARTIN
BY
Abraham Friedman
ATTORNEY

July 12, 1949.  G. MARTIN  2,475,797
COLLAPSIBLE CART

Filed Nov. 1, 1947  4 Sheets-Sheet 2

INVENTOR.
GEORGE MARTIN
BY Abraham Friedman
ATTORNEY

INVENTOR.
GEORGE MARTIN
BY Abraham Friedman
ATTORNEY

July 12, 1949.  G. MARTIN  2,475,797
COLLAPSIBLE CART

Filed Nov. 1, 1947  4 Sheets-Sheet 4

INVENTOR.
GEORGE MARTIN
BY
Abraham Friedman
ATTORNEY

Patented July 12, 1949

2,475,797

UNITED STATES PATENT OFFICE 2,475,797

COLLAPSIBLE CART

George Martin, New Hyde Park, N. Y.

Application November 1, 1947, Serial No. 783,521

10 Claims. (Cl. 280—36)

1

This invention relates to improvements in collapsible carts and more particularly to those in the nature of collapsible shopping carts commonly used for the purpose of receiving, storing and transporting articles or parcels in the course of shopping or similar activities.

It is a general object of this invention to provide an open top collapsible cart of rigid and sturdy construction which nevertheless is light in weight, so that it might be propelled from place to place with a minimum of effort. The arrangement of the various parts of said cart being such as to provide for ease of economical manufacture and large scale production.

A more particular object of this invention is to provide a cart of sturdy construction which may be collapsed easily to occupy a minimum of storage space when not in use and which will nevertheless rigidly maintain its shape when it is being utilized for transportation purposes.

A further object of this invention is to provide a collapsible cart with a hinged bottom which may be set up and collapsed with a snap action which will maintain itself automatically in the desired position without the use of additional catches or other retaining devices.

Another object of this invention is to provide a collapsible cart with a hinged bottom which may be collapsed or set up with a minimum of effort and which is provided with a means for raising and lowering the hinged bottom thereof, thereby making it more convenient and practical for use.

Other and further objects of this invention will become apparent from the description thereof contained in the annexed specifications, or will otherwise become obvious. It will be understood that the invention here disclosed may be employed for other purposes to which the structure and arrangement are adapted.

Referring to the drawings, similar reference numerals refer to similar parts throughout.

Figure 1:
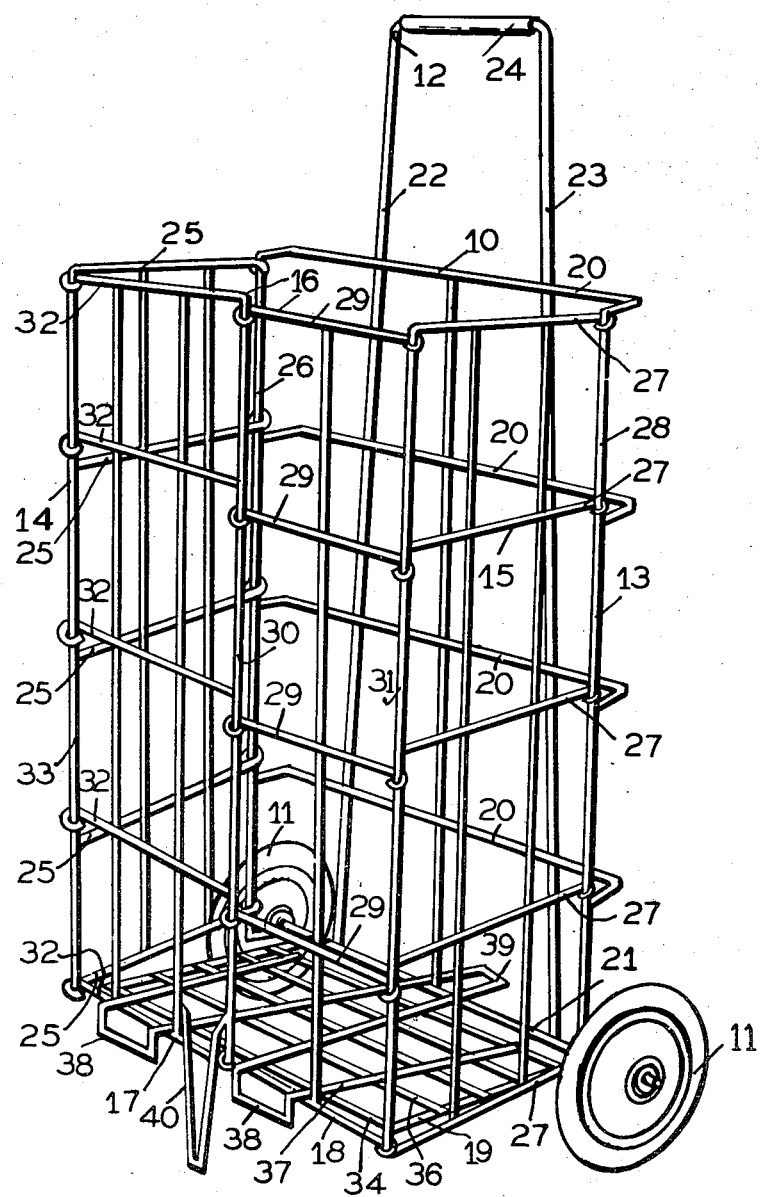
Fig. 1 is a perspective view of the collapsible cart in its set up condition ready for use.

A preferred embodiment of the present invention is shown in Fig. 1 of the accompanying drawings. The vehicle is comprised of an open top collapsible receptacle or container 10. It is preferred to form the container of vertically and horizontally disposed rodlike members of small diameter in parallel spaced relation. These may be sections of metal wire or tubing suitably joined at appropriate junctures as by welding, soldering or riveting to form a reticulated or latticelike structure, such as a wire mesh or grid. This type of construction has been found to be desirable since it combines adequate stiffness to retain the necessary shape of the container with sufficient resilience for the proper operation thereof as will more particularly appear hereafter. Ground engaging wheel elements 11 are suitably provided at the bottom of the container as will be more particularly pointed out. Said container is also provided with suitable handle elements 12.

Figure 8:
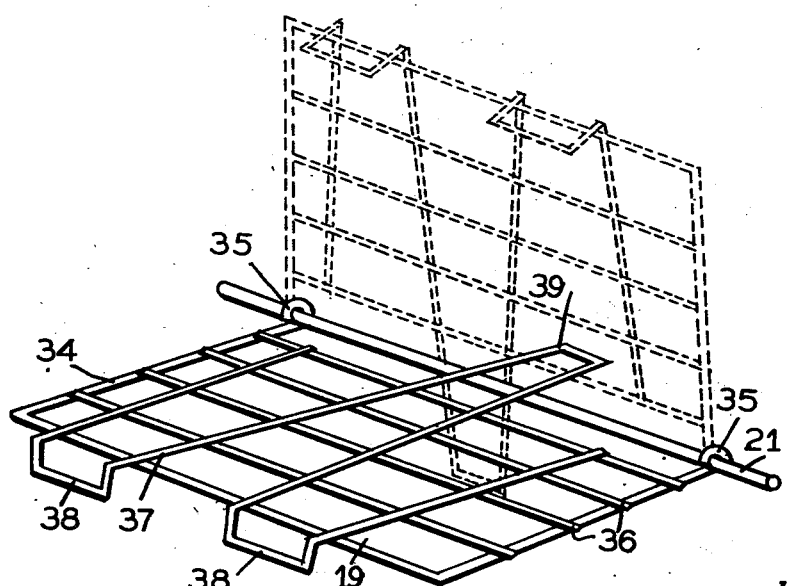
Fig. 8 is an enlarged perspective view of the hinged bottom panel showing its position when the cart is in open condition and showing the position of the hinged bottom panel when the cart is collapsed, by broken lines.

As shown in Fig. 1, the container 10 is comprised of a rear panel 13, two side panels 14, 15 and a front panel assembly 16 formed of two sub-panels 17, 18. As heretofore stated, the panels are formed of vertically and horizontally disposed wire sections in parallel spaced relation. In the case of the front and side panels the vertical sections are disposed on the interior side of the container. Closure for the bottom of the container is provided by means of a pivotally or hingedly mounted bottom panel 19, as shown in Fig. 1 and Fig. 8.

Figure 7:
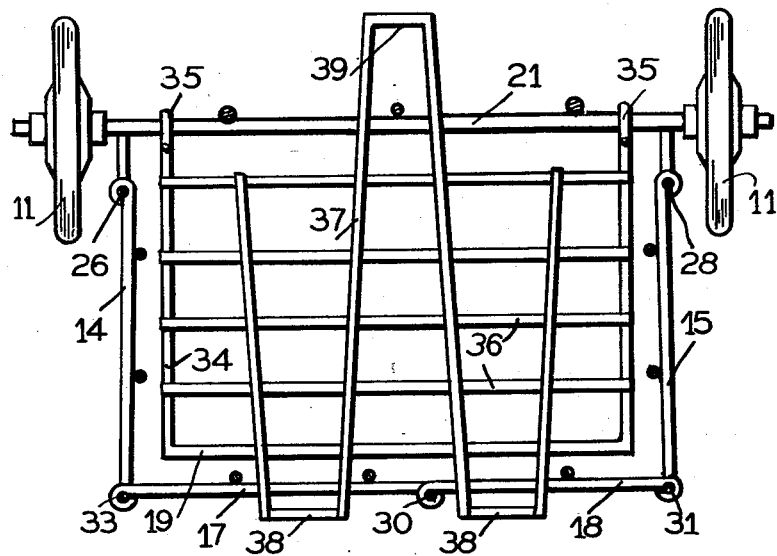
Fig. 7 is an enlarged section of the cart shown in Fig. 1 showing the hinged bottom panel of the cart in plan.

The rear panel 13 is U-shaped in horizontal section, its shape being defined by a series of U-shaped horizontal wires 20 in parallel spaced relation. The bottom horizontal wire 21 of the rear panel 13 extends beyond the side edges thereof. These extensions provide suitable means for the mounting of ground engaging wheel elements 11, as is more clearly shown in Fig. 7. Vertical wires 22, 23, which may be formed of a continuous wire section, may advantageously be extended beyond the top of the rear panel 13 to form a loop thus providing suitable handle means 12 for the cart. A hand grip element 24 is provided on the loop for additional convenience.

Side panel 14 is pivotally secured to rear panel 13 by looping the free ends of horizontal wires 25 around the vertical marginal wire 26 of rear panel 13. Side panel 15 is similarly secured to rear panel 13 by looping the free ends of horizontal wires 27 around the other vertical marginal wire 28 of said rear panel. It will thus be seen that these side panels are free to swing or pivot on the axis of both of the vertical marginal wires of the rear panel.

Front panel assembly 16 is comprised of sub-panels 17 and 18. These sub-panels are pivotally secured to each other by looping the free inside ends of horizontal wires 29 of sub-panel 18 around the marginal vertical wire 30 of sub-panel 17. The outside free ends of horizontal wires 29 are looped around vertical marginal wire 31 which comprises the forward edge of side panel 15. Pivotal support for sub-panel 17, with respect to side panel 14, is similarly provided by looping the free ends of horizontal wires 32 of the sub-panel around vertical marginal wire 33 which comprises the forward edge of said side panel. It will be seen that by means of this pivot or hinge arrangement the walls of the container are articulated with respect to the rear panel thereof and with respect to each other. It will further be seen that similar articulation is provided for the two sub-panels 17 and 18 which together form the front panel assembly 16 with respect to each other.

Closure for the bottom of the container is provided by means of a pivotally mounted bottom panel 19 as shown in Fig. 1. In accordance with the preferred embodiment of the invention, the construction of the bottom panel is similarly reticulated or gridlike. As more clearly shown in Fig. 7, the perimeter of three sides of the bottom panel is defined by marginal wire 34 whose free ends 35 are looped around the bottom horizontal wire or axle 21 thereby pivotally securing said panel to the rear panel 13. Transverse wires 36 are suitably secured as by welding to the marginal wire 34 and longitudinal wire 37, which may be formed of separate sections or by suitably bending a continuous wire, is similarly secured to said marginal wire 34 and to the transverse wires 36 at its junctures therewith.

Depending loops 38 may be advantageously formed by symmetrically extending and bending wire 37 downwardly beyond the forward edge of the bottom horizontal wires of sub-panels 17 and 18. These loops 38 rest upon and removably engage said bottom horizontal wires when the container 10 is in open position thereby retaining the bottom panel 19 in a substantially horizontal plane and preventing the front and side panels of the container 10 from collapsing while in use. It will be obvious that the bottom panel of the container thus serves as a positive locking means and insures against any accidental collapse of the container. In order to obviate the inconvenience which would ordinarily result from the necessity of manually raising or lowering the bottom of a container of this type whenever it is desired to set up or collapse the container which would ordinarily be accomplished by reaching into the container for that purpose, a foot pedal 39 is provided. Although a separate element suitably secured to the bottom panel as by welding may be utilized for this purpose, it has been found convenient to extend wire 37 rearwardly beyond bottom wire or axle 21 to form a pedal to which pressure may conveniently be applied. Upon the downward application of pressure to pedal 39 loops 38 are disengaged from the front panels and the bottom panel 19 pivots on wire or axle 21 as shown in Fig. 8 swinging from the position in a horizontal plane which it normally occupies while the container is open to a position in a vertical plane as shown by broken lines. It then rests parallel with the plane of the rear panel 13 and is immediately adjacent thereto. When it is desired to return the bottom panel 19 to its horizontal position it is merely necessary to apply pressure to the pedal 39 in the opposite direction. By this arrangement considerable convenience in the use and operation of the container is achieved.

In order to hold the entire cart in a vertical position, when at rest, front rest 40 is provided. The front rest element 40 may conveniently be formed of a suitable loop of wire and secured to the bottom portion of one of the front sub-panels. As illustrated in Fig. 1, the front rest 40 is secured to the bottom portion of sub-panel 17 and holds the cart in vertical position by ground engagement.

The panels of the container are so proportioned that the width of the front panel assembly 16 is substantially equal to the width of rear panel 13, the distance between the longitudinal axes of wires 28 and 26 being substantially equal to the distance between the longitudinal axes of wires 31 and 33 when the container is in open condition. In addition thereto, sub-panel 17 is substantially equal in width to side panel 14. The distance between the longitudinal axes of wires 30 and 33 is therefore substantially equal to the distance between the longitudinal axes of wires 26 and 33. The side panels are substantially equal in width.

Figure 2:
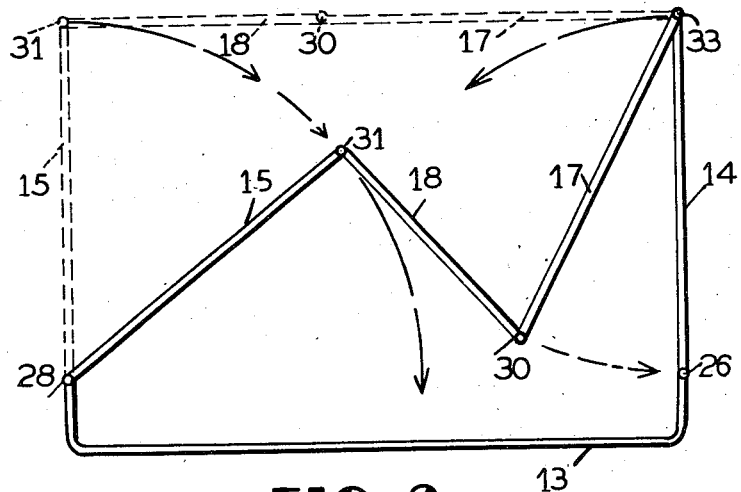
Fig. 2 is a diagrammatic representation, in plan, as viewed from the rear, of the mode of collapsing the cart and the relative position of the various panels at the commencement of the collapsing operation.
Figure 3:
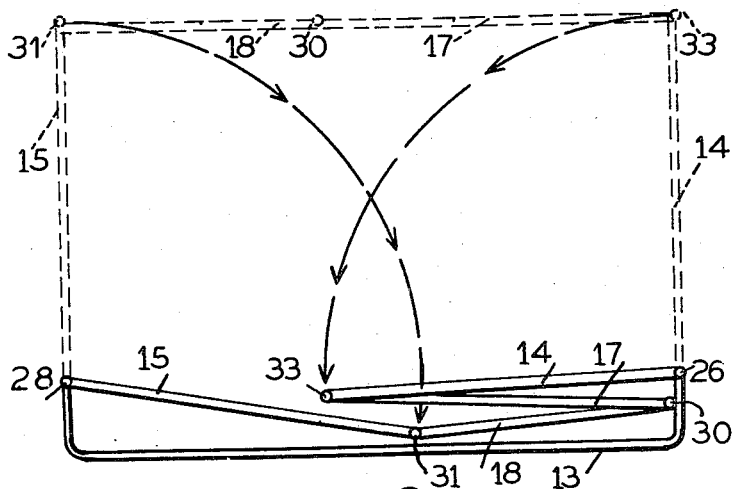
Fig. 3 is a view similar to that of Fig. 2 showing the relative positions of the various panels when the cart is in completely collapsed condition.
Figure 4:
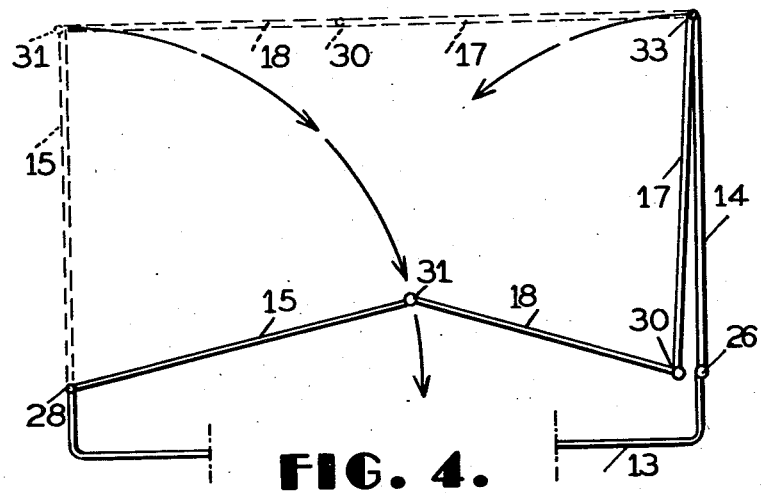
Fig. 4 is a view similar to that of Fig. 2 showing the relative positions of the various panels as they develop from the positions shown in Fig. 2.
Figure 5:
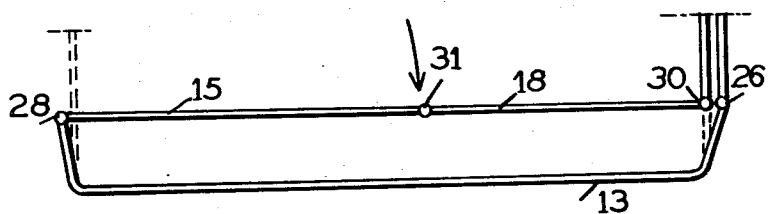
Fig. 5 is a view similar to Fig. 2 showing the further development of the positions of the various panels from Fig. 4 during the collapsing operation.
Figure 6:
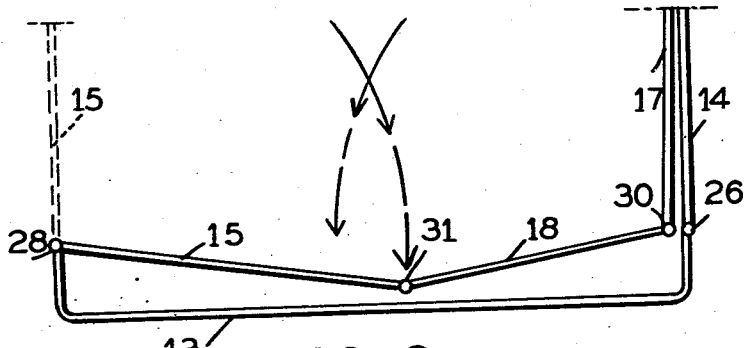
Fig. 6 is a view similar to Fig. 2 showing the relative positions of the various panels as they develop from Fig. 5.

The mode of collapsing the container will now be more particularly described. Bottom panel 19 is swung from its horizontal position to its position in a vertical plane parallel to and adjacent with rear panel 13. The container is now in condition for the collapsing of the front and side panels. Figures 2, 3, 4, 5 and 6 illustrates diagrammatically the relative positions of the respective panels as viewed from the rear during the development of the collapsing process. Broken lines in these figures indicate the normal position of these panels when the container is open. In the first step of the collapsing operation as shown in Fig. 2, side panel 15 and front sub-panel 18 are moved inwardly and approach rear panel 13. As a result of this motion, front sub-panel 17 swings towards side panel 14 as indicated by the arrows. When the panels reach the relative positions indicated in Fig. 4, additional pressure upon side panel 15 or sub-panel 18 and particularly on vertical wire 31, which acts as a pivot point, will result in a slight flexion of the horizontal wires of some of the panels, which are thereby resiliently displaced from their normal positions as more clearly indicated in Fig. 5. Consequently side panel 15 and sub-panel 18 assume the position indicated in Fig. 6 with a snap action. As a result of this snap action side panel 15 and sub-panel 18 are positively retained in the position indicated in Fig. 6. As shown in Fig. 3, sub-panel 17 and side panel 14 are then swung in unison toward the rear panel as indicated by the arrows and assume the positions indicated with a similar snap action. All of the panels are now in collapsed position and rest positively within the channel defined by the side arms of the U-shaped rear panel 13. As a result of the arrangement of parts and their cooperation the entire cart having been collapsed retains itself in that condition without the use of locking or other retaining devices and will occupy a minimum of space.

Similarly, when the container 10 is to be erected, the movement of side panel 14 and sub-panel 17, particularly by the outward movement of the pivot point provided by vertical wire 33, will cause these panels to open in unison with a snap action. Similar outward movement of side panel 15 and sub-panel 18, particularly by applying outward pressure at the pivot point provided by vertical wire 31, will cause these panels to move outwardly with a snap action. The bottom panel 19 is then lowered so that it occupies a position in a horizontal plane in which loops 38 rest upon and engage the bottom marginal wires of sub-panels 17 and 18 thereby causing the entire assembly to remain firmly in open condition for use.

I have here shown and described a preferred embodiment of my invention. It will be apparent, however, that this invention is not limited to this embodiment and that many changes, additions and modifications can be made in connection therewith without departing from the spirit and scope of the invention as herein disclosed and hereinafter claimed.

Having described my invention, what I claim as new and desire to secure by Letters Patent is:

1. A mobile wheeled container, comprising a front panel, two side panels and a U-shaped rear panel which is rigidly secured to an axle, said panels being hingedly secured to each other along their longitudinal side edges, a bottom panel hingedly secured to the bottom edge of said rear panel and adapted for movement upwardly toward said rear panel, said front and side panels being collapsible toward the rear panel and toward each other, wheel means secured to said axle, the side arms of said U-shaped rear panel being of sufficient depth to encompass all of the panels of the container within the channel defined thereby when in collapsed position.

2. In a collapsible cart, a plurality of panels forming a container, a pivotally secured bottom panel disposed at the bottom of the container, a foot pedal element secured to said bottom panel and extending beyond the perimeter of said container said foot pedal element comprising an extension of said bottom panel beyond its pivotal point and comprising a lever arm adapted to raise the bottom panel upon downward application of foot pressure.

3. In a collapsible cart, a container formed of a plurality of reticulated panels having resilient horizontal elements and comprising a U-shaped rear panel, two side panels and a front panel assembly formed of two sub-panels, said sub-panels being pivotally secured to each other, said side panels being pivotally secured to the side arms of the rear panel along one of their side edges and pivotally secured to the side edges of the front panel assembly along the other of their sides edges, said rear panel being equal in width to the combined widths of the sub-panels forming the front panel assembly, one of said sub-panels being equal in width to either of the side panels.

4. In a collapsible cart, a container formed of a plurality of reticulated panels having resilient horizontal elements and comprising a U-shaped rear panel, two side panels and a front panel assembly formed of two sub-panels, said sub-panels being pivotally secured to each other, said side panels being pivotally secured to the side arms of the rear panel along one of their side edges and pivotally secured to the side edges of the front panel assembly along the other of their side edges, said front and side panels being formed of horizontal elements having vertical elements disposed on their interior sides, said rear panel being equal in width to the combined widths of the sub-panels forming the front panel assembly, one of said sub-panels being equal in width to either of the side panels.

5. A collapsible cart formed of a plurality of reticulated panels, comprising a U-shaped rear panel, two side panels and a front panel assembly formed of two sub-panels, said sub-panels being pivotally secured to each other, said side panels being pivotally secured to the side arms of the rear panel along one of their side edges and pivotally secured to the side edges of the front panel assembly along the other of their said edges, an axle element integral with the bottom of the rear panel and extending beyond the side edges thereof, wheel elements mounted on said axle, a bottom panel pivotally secured to the axle element for displacement from a horizontal to a vertical position, means extending rearwardly from said bottom panel for imparting movement thereto, depending loops forwardly extending from said bottom panel adapted to removeably engage the bottom portion of the front sub-panels, a depending rest element secured to the bottom portion of one of the front sub-panels, a handle element integral with the rear panel, a hand grip for said handle element.

6. A collapsible cart formed of a plurality of reticulated panels, comprising a U-shaped rear panel, two side panels and a front panel assembly formed of two sub-panels, said sub-panels being pivotally secured to each other, said side panels being pivotally secured to the side arms of the rear panel along one of their side edges and pivotally secured to the side edges of the front panel assembly along the other of their side edges, said panels having horizontal resilient elements, an axle element integral with the bottom of the rear panel and extending beyond the side edges thereof, wheel elements mounted on said axle, a bottom panel pivotally secured to the axle element for displacement from a horizontal to a vertical position, means extending rearwardly from said bottom panel for imparting movement thereto, depending loops forwardly extending from said bottom panel adapted to removeably engage the bottom portion of the front sub-panels, a depending rest element secured to the bottom portion of one of the front sub-panels, a handle element integral with the rear panel, a hand grip for said handle element.

7. A collapsible cart formed of a plurality of reticulated panels comprising a U-shaped rear panel having resilient horizontal elements, two side panels and a front panel assembly formed of two sub-panels, said sub-panels being pivotally secured to each other, said side panels being pivotally secured to the side arms of the rear panel along one of their side edges and pivotally secured to the side edges of the front panel assembly along the other of their side edges, said front and side panels being formed of horizontal resilient elements having vertical elements disposed on their interior sides, said rear panel being equal in width to the combined widths of the sub-panels forming the front panel assembly, one of said sub-panels being equal in width to either of the side panels, an axle element integral with the bottom of the rear panel and extending beyond the side edges thereof, wheel elements mounted on said axle, a bottom panel pivotally secured to the axle element for displacement from a horizontal to a vertical position, means extending rearwardly from said bottom panel for imparting movement thereto, depending loops forwardly extending from said bottom panel removeably engaging the bottom portion of the front sub-panels, a depending rest element secured to the bottom portion of one of the front sub-panels, a handle element integral with the rear panel and a hand grip secured thereto.

8. A collapsible cart formed of a plurality of reticulated panels comprising a U-shaped rear panel having resilient horizontal elements, two side panels and a front panel assembly formed of two sub-panels, said sub-panels being pivotally secured to each other, said side panels being pivotally secured to the side arms of the rear panel along one of their side edges and pivotally secured to the side edges of the front panel assembly along the other of their side edges, said front and side panels being formed of horizontal resilient elements having vertical elements disposed on their interior sides, said rear panel being equal in width to the combined widths of the sub-panels forming the front panel assembly, one of said sub-panels being equal in width to either of the side panels, an axle element integral with the bottom of the rear panel and extending beyond the side edges thereof, wheel elements mounted on said axle, a bottom panel pivotally secured to the axle element for displacement from a horizontal to a vertical position, means extending rearwardly from said bottom panel for imparting movement thereto, depending loops forwardly extending from said bottom panel removeably engaging the bottom portion of the front sub-panels, a depending rest element secured to the bottom portion of one of the front sub-panels, a handle element integral with the rear panel and a hand grip secured thereto, the side arms of the U-shaped rear panel being of sufficient depth to encompass all of the panels of the container within the channel defined thereby when in collapsed position.

9. In a collapsible cart, a plurality of panels forming a container, a rear panel, a pivotally secured bottom panel disposed at the bottom of said container, a foot pedal element secured to said bottom panel and extending rearwardly beyond the rear panel of said container, adapted when depressed to raise said bottom panel.

10. In a mobile wheeled container, comprising a plurality of panels supported by an axle having ground engaging wheel elements mounted thereon, a pivotally secured bottom panel disposed at the bottom of the container, said bottom panel having a bottom forming portion extending along one side of said axle and a foot engageable portion extending beyond the other side of said axle, said foot engageable portion being adapted to raise the bottom forming portion upon being depressed by foot pressure.

GEORGE MARTIN.

REFERENCES CITED

The following references are of record in the file of this patent:

UNITED STATES PATENTS

| Number | Name | Date |
|---|---|---|
| 2,421,322 | Frazin | May 27, 1947 |